(No Model.)
H. C. STIFEL.
WATER CLOSET.
No. 515,886. Patented Mar. 6, 1894.
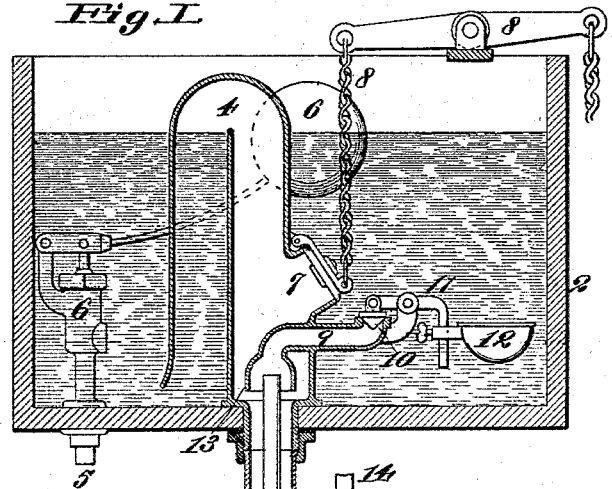
Fig. I.
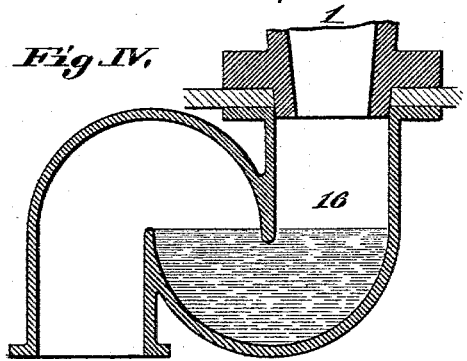
Fig. IV.
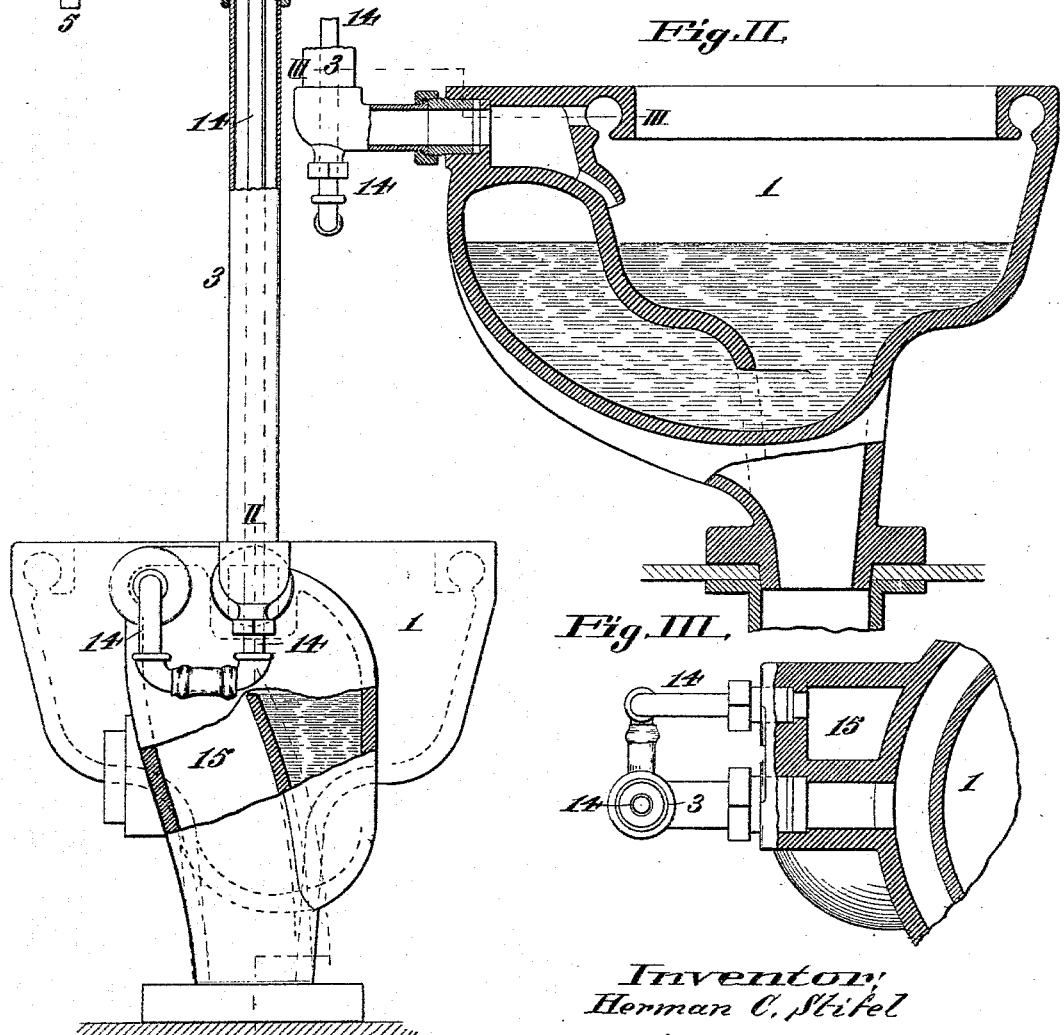
Fig. II.
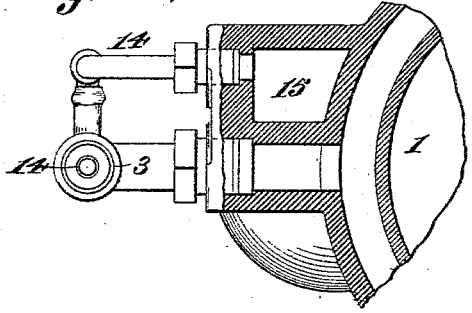
Fig. III.
Inventor,
Herman C. Stifel
Attest:
Benj. A. Knight
By Knight Bros
attys.

UNITED STATES PATENT OFFICE.

HERMAN C. STIFEL, OF ST. LOUIS, MISSOURI, ASSIGNOR TO STIFEL-O'NEIL HOME COMFORT CO., OF SAME PLACE.

WATER-CLOSET.

SPECIFICATION forming part of Letters Patent No. 515,886, dated March 6, 1894.

Application filed March 17, 1893. Serial No. 466,485. (No model.)

*To all whom it may concern:*

Be it known that I, HERMAN C. STIFEL, of the city of St. Louis, in the State of Missouri, have invented a certain new and useful Improvement in Water-Closets, of which the following is a full, clear, and exact description, reference being had to the accompanying drawings, forming part of this specification.

My invention relates to certain improvements in water closets, of the siphonic type; and my invention consists in features of novelty hereinafter fully described and pointed out in the claims.

Figure I is a vertical section, part in elevation, illustrative of my invention. Fig. II is a vertical section of the bowl, taken on line II—II, Fig. I. Fig. III is a detail, horizontal section, taken on line III—III, Fig. II. Fig. IV is a detail section, showing the trap beneath the bowl-neck.

Referring to the drawings, 1 represents the bowl.

2 represents the water tank, and 3 the discharge pipe connecting the tank to the bowl in the usual manner.

4 represents the usual siphon located in the tank, and through which the water passes to the pipe 3.

5 is a supply pipe having the usual valve and float 6.

7 is a valve operated by chains and lever 8, as usual, to start the siphon when the bowl is to be flushed.

9 is the vent pipe for breaking the siphon, and which is under the control of a valve 10 operated by a pivoted lever 11 and float 12. The pipe has a bell mouth 13.

14 represents a small air pipe, which I prefer to locate within the discharge pipe 3, and the upper end of which is beneath the bell 13 of the pipe 9, and preferably enters the mouth of the bell a short distance, as shown in Fig. I. The pipe 14 projects to the lower end of the pipe 3, and connects with the chamber 15 located between the traps of the bowl.

The operation is as follows:—To flush the bowl, the valve 7 is raised, producing a siphon, which causes the water to pass from the tank 2 to the bowl 1, through the pipe 3. The valve 7 is allowed to close immediately. As the water passes down over the bell 13 of the pipe 9, it creates an upward current of air in the pipe 14 to rarefy the air and start the siphon between the traps of the bowl. The water continues to pass from the tank to the bowl until the float 12 descends, which opens the valve 10, and allows an influx of air through the pipe 9. A portion of this air passes through the pipe 14 and breaks the siphon in the chamber 15 between the traps of the bowl, and at the same time air breaks the action of the siphon 4, so that the water ceases to pass from the tank to the bowl. The water contained in the pipe 3 after the siphon is broken, forms the after-flow to fill the traps and the bowl.

By reason of arranging the pipe 14, with its upper end located within the siphon 4, which has a short leg extending into the water of the tank, and having no other vent than the valve 7, which is closed before the water is reduced in the tank through this valve, there is no possible escape of foul air from the pipe 14 through the water tank from where it might escape into the room.

I do not wish to be limited to the form of the air pipe 9, with its valve as a means for breaking the siphonic action, as other forms of vents may be employed.

In Fig. IV I have shown a trap 16 beneath the bowl 1.

I claim as my invention—

1. In a water closet, the combination of a bowl, a tank, a siphon located within the tank, and having no vent above the surface of the water, a discharge pipe connecting the tank to the bowl through means of a siphon, an air pipe extending from the chamber 15 of the bowl into the siphon, and a vent pipe, the mouth of which extends over the air pipe substantially as and for the purpose set forth.

2. In a water closet, the combination of a bowl, a water tank, a siphon located in the tank, without a vent above the water surface, a discharge pipe connecting the tank with the bowl through means of said siphon, an air pipe extending from the chamber 15 of the bowl, and through the pipe 3 of said siphon, and a vent pipe 9 having a bell mouth 13, said bell mouth 13 extending over the air pipe and a suitable valve and float, substantially as and for the purpose set forth.

HERMAN C. STIFEL.

In presence of—
E. S. KNIGHT,
BENJN. A. KNIGHT.